US006645411B2

(12) United States Patent
Dänekas et al.

(10) Patent No.: US 6,645,411 B2
(45) Date of Patent: Nov. 11, 2003

(54) PROCESS FOR THE PRODUCTION OF CONDUCTING WIRES COATED WITH CROSS-LINKED POLYETHYLENE

(75) Inventors: Franz Dänekas, Garbsen (DE); Marc Strittmatter, Hannover (DE)

(73) Assignee: Nexans, Paris (FR)

( * ) Notice: Subject to any disclaimer, the term of this patent is extended or adjusted under 35 U.S.C. 154(b) by 272 days.

(21) Appl. No.: 09/833,570

(22) Filed: Apr. 13, 2001

(65) Prior Publication Data

US 2002/0050389 A1 May 2, 2002

(30) Foreign Application Priority Data

Apr. 17, 2000 (EP) ................................ 00401068

(51) Int. Cl.⁷ ...................... B29C 47/02; B32B 15/08
(52) U.S. Cl. .................. 264/171.15; 264/171.19; 264/171.23; 264/236
(58) Field of Search ................. 264/171.19, 477, 264/171.14, 171.15, 171.23, 171.24, 211.24, 236

(56) References Cited

U.S. PATENT DOCUMENTS

| | | | | |
|---|---|---|---|---|
| 4,107,245 A | * | 8/1978 | Jansson | 264/40.1 |
| 4,161,419 A | * | 7/1979 | Alia | 156/51 |
| 4,276,251 A | | 6/1981 | Bopp | |
| 4,528,155 A | * | 7/1985 | Elder | 264/171.19 |
| 4,839,412 A | * | 6/1989 | Harrell et al. | 524/436 |
| 5,055,515 A | * | 10/1991 | Backderf | 524/533 |
| 5,132,350 A | * | 7/1992 | Keogh | 524/267 |
| 5,256,482 A | * | 10/1993 | Yamanouchi et al. | 428/375 |
| 5,492,760 A | * | 2/1996 | Sarma et al. | 428/378 |
| 5,719,218 A | * | 2/1998 | Sarma | 524/100 |
| 5,744,553 A | * | 4/1998 | Kempter | 525/333.8 |
| 5,922,823 A | * | 7/1999 | Sagane et al. | 526/336 |
| 6,025,422 A | * | 2/2000 | Hall | 524/405 |
| 6,087,431 A | * | 7/2000 | Uchida et al. | 524/490 |
| 6,495,760 B1 | * | 12/2002 | Castellani et al. | 174/110 R |

FOREIGN PATENT DOCUMENTS

| | | |
|---|---|---|
| DE | 1 494046 | 1/1969 |
| DE | 3035709 A1 | 4/1982 |
| FR | 2 201 312 | 4/1974 |

\* cited by examiner

*Primary Examiner*—Mark Eashoo
(74) *Attorney, Agent, or Firm*—Sughrue Mion, PLLC

(57) ABSTRACT

In a process for the production of conducting wires coated with cross-linked polyethylene in which a granulate made of polyethylene is coated with a fluid cross-linking agent, the coated granulate is melted in an extruder and extruded onto the electrical conducting wire, and the extruded film is cross-linked by being heated to a temperature over the decomposition temperature of the cross-linking agent, a mixture of granulate, meal, or powder made of a polyethylene homopolymer and a polyethylene copolymer is coated with the cross-linking agent and stabilizer, with the portion of copolymer in the coating on the cable lying between 1 and 8 weight percent.

13 Claims, No Drawings

PROCESS FOR THE PRODUCTION OF CONDUCTING WIRES COATED WITH CROSS-LINKED POLYETHYLENE

This application is based on and claims the benefit of European Patent Application No. 00401068.2 filed Apr. 17, 2000, which is incorporated by reference herein.

BACKGROUND OF THE INVENTION

The invention concerns a process for producing conducting wires coated with cross-linked polyethylene, in which process a material made of polyethylene is coated with a fluid cross-linking agent, the coated material is melted in an extruder and extruded onto the electrical conducting wire, and the extruded layer is cross-linked by heating to a temperature above the decomposition temperature of the cross-linking agent.

A process for the production of electrical conductors coated with cross-linked polyethylene is known from published German patent application DE 14 94 046 in which a polyethylene granulate is coated with a molten cross-linking agent at normal pressure, the granulate is melted in an extruder and homogenized, and the melt is applied to the electrical conductor. Molten dicumyl peroxide is used as a cross-linking agent. The cross-linking of the insulating layer occurs in a continuous vulcanization plant (cross-linking plant) at a temperature above the decomposition temperature of the cross-linking agent and at an elevated pressure.

Medium high-voltage or high-voltage cables with an insulating layer made of polyethylene have, in some circumstances, defects in the form of cavities, impurities, and surface defects which could lead to so-called electrical tree formation. In the presence of moisture and electrical load, so-called water trees could occur, which lead to destruction of the insulating layer. Attempts have been made to prevent these disadvantages by using so-called triple extrusion, i.e., the internal conducting layer, insulating layer, and external conducting layer are produced simultaneously through coextrusion by means of a triple extruder head. Impurities and cavities in the insulating layer and/or between the layers can hereby be minimized.

Another method performs a dry cross-linking instead of the steam cross-linking, with the heat transferred to the cable insulation by means of radiation.

Neither solution has been fully satisfactory. Optimization of the insulation material has also been attempted. Thus, the addition of so-called water tree inhibitors, which are derived from polymers, such as, e.g., organopolysiloxane, polyethylene glycol, epoxide resins, polypropylene, polystyrene, and polyvinyl alcohol, to the polyethylene during its production has been described. The desired effects and the influence on water tree growth vary greatly. In many cases, the additives have a deleterious effect on the homogeneity and the aging stability of the polyethylene, as well as on the electrical properties of the insulation material.

SUMMARY OF THE INVENTION

It is therefore an object of the present invention to providing a process for the production of medium high-voltage and/or high-voltage cables which is significantly more economical than the previously known processes and provides cable which has a higher resistance to the formation of water trees and therefore a longer service life.

This object is achieved according to the present invention by using in the coating material a mixture of granulate, meal, or powder made of a polyethylene homopolymer and a polyethylene copolymer together with a cross-linking agent and stabilizer, with the portion of copolymer in the coating on the cable lying between 1 and 8 weight percent.

The essential advantage of the invention can be seen in that by the use of a mixture of polyethylene homopolymer and polyethylene copolymer with a limited amount of copolymer, the resistance of the cable insulation to the formation of water trees can be significantly increased. Polyethylene homopolymer offered at a reasonable price by numerous polymer producers as a sort of staple item, largely for processing into polyethylene films, can be used. Therefore, expensive "specialties" of the polymer producers can be dispensed with.

Further features and advantages of the invention will be apparent from the description and claims below.

DETAILED DESCRIPTION OF THE INVENTION

The invention will be described in more detail with reference to several exemplary embodiments.

EXAMPLE 1

80 parts LDPE as a granulate with a density of approximately 0.92 g/cc and 20 parts of polyethylene copolymer as a granulate are mixed together with two parts dicumyl peroxide or tert butylcumyl peroxide and 0.2 parts stabilizer in a mixer located above the feed area of an extruder. In order to accelerate the diffusion of the peroxide and/or stabilizer into the granulate, the granulate is prewarmed to a temperature between 50 and 80° C. After the material is fed into the extruder, the material is melted, homogenized, and extruded onto the conductor. The cross-linking occurs under pressure in a so-called CV (continuous vulcanization) line, with temperatures above the decomposition temperature of the peroxide achieved through the supply of heat from outside.

In an attached cooling tunnel, the cable is cooled down while still under pressure to a temperature below the melting point of polyethylene and wound onto a cable drum.

EXAMPLE 2

The same mixture composition as in example 1 is mixed in a tumbler mixer at a temperature between 50–80° C., which diffuses the peroxide and stabilizer into the granulate. The mixture can be stored, packed in containers and later transported to the manufacturing plant. The mixture is poured into the hopper of the extruder, melted within the extruder homogenized, and extruded onto the conductor. The subsequent steps are the same as in example 1.

EXAMPLE 3

80 parts LDPE and 20 parts PE copolymer are mixed together in one work cycle with a masterbatch comprising one or more polymers, a peroxide cross-linking agent, and a stabilizer, wherein the masterbatch is highly concentrated in peroxide/stabilizer. The mixture is subsequently fed directly to the extruder.

Prewarming of the granulate for faster diffusion of peroxide and stabilizer is not required.

The subsequent steps are the same as in examples 1 and 2.

Results

Samples of the model cables produced according to examples 1 to 3 were tested for electrical puncture strength before and after a wet aging test. The electrical puncture strength after wet aging can be decisively improved with this process relative to the results from cables insulated with polyethylene homopolymer.

What is claimed is:

1. A process for the production of an electric cable comprising at least one conducting wire coated with cross-linked polyethylene, the process comprising the steps of:

mixing (i) a material made of polyethylene, (ii) a fluid cross-linking agent, and (iii) stabilizer to form a mixture;

melting said mixture in an extruder to form a melt;

extruding said melt onto the electrical conducting wire to form an extruded layer on the wire; and cross-linking said extruded layer by heating to a temperature above the decomposition temperature of the cross-linking agent, wherein:

said material made of polyethylene comprises a mixture of granulate, meal, or powder made of a polyethylene homopolymer and a polyethylene copolymer;

said polyethylene copolymer comprises at least one of ethylene-butyl acrylate (EBA), ethylene-ethyl acrylate (EEA) and ethylene-methyl acrylate (EMA), and said acrylate portion of said polyethylene copolymer is from 10–30 wt % of said copolymer; and said polyethylene copolymer is between 1 and 8 weight percent of said extruded layer.

2. A process according to claim 1, wherein the polyethylene homopolymer and the polyethylene copolymer are mixed in a tumbler mixer at an elevated temperature, which temperature is below the melting point of the polyethylene homopolymer and/or polyethylene copolymer, and are simultaneously mixed with a fluid mixture of cross-linking agent and stabilizer.

3. A process according to claim 1, wherein the polyethylene homopolymer and the polyethylene copolymer are mixed in a tumbler mixer at a temperature which is below the melting point of the polyethylene homopolymer and/or the polyethylene copolymer, and are simultaneously mixed with a highly concentrated peroxide/stabilizer masterbatch based on polymers.

4. A process according to claim 1, wherein the polyethylene homopolymer and the polyethylene copolymer are mixed with one another in a mixer upstream from the extruder and are simultaneously mixed with a fluid mixture of cross-linking agent and stabilizer or a highly concentrated peroxide/stabilizer masterbatch based on polymers.

5. A process according to claim 4, wherein the mixing occurs at a temperature which is below the melting point of the polyethylene homopolymer and the polyethylene copolymer.

6. A process according to claim 5, wherein the mixing occurs at a temperature between 50 and 70° C.

7. A process according to claim 1, wherein in a preceding work cycle, a highly concentrated peroxide/stabilizer masterbatch comprising (a) at least one of LDPE, LLDPE, VLDPE, and polyethylene copolymer, (b) peroxide cross-linking agent, and (c) stabilizer is produced such that the total of said peroxide cross-linking agent and stabilizer is from 1–40% of the masterbatch, and said masterbatch is mixed with granulate, meal, or powder made of at least one of polyethylene homopolymer and polyethylene copolymer, and subsequently melted and extruded.

8. A process according to claim 1, wherein said acrylate portion of said polyethylene copolymer is more than 16 wt % and up to 30 wt % of said polyethylene copolymer.

9. A process according to claim 1, wherein said polyethylene homopolymer comprises at least one of LDPE, LLDPE and VLDPE.

10. A process according to claim 1, wherein said cross-linking agent comprises a peroxide.

11. A process according to claim 10, wherein said cross-linking agent comprises tert butylcumyl peroxide.

12. A process according to claim 10, wherein, in addition to the peroxide, a co-cross-linker is used as a cross-linking agent.

13. A process according to claim 12, wherein said co-cross-linker is triallyl cyanurate.

* * * * *